US011763206B2

(12) United States Patent
Vassilev (10) Patent No.: US 11,763,206 B2
(45) Date of Patent: Sep. 19, 2023

(54) DEVICE AND METHOD FOR MULTI-CLASS CLASSIFICATION BY MACHINE LEARNING

(71) Applicant: COMMISSARIAT A L'ENERGIE ATOMIQUE ET AUX ENERGIES ALTERNATIVES, Paris (FR)

(72) Inventor: Andrea Vassilev, Grenoble (FR)

(73) Assignee: COMMISSARIAT A L'ENERGIE ATOMIQUE ET AUX ENERGIES ALTERNATIVES, Paris (FR)

(*) Notice: Subject to any disclaimer, the term of this patent is extended or adjusted under 35 U.S.C. 154(b) by 946 days.

(21) Appl. No.: 16/533,002

(22) Filed: Aug. 6, 2019

(65) Prior Publication Data
US 2020/0050964 A1 Feb. 13, 2020

(30) Foreign Application Priority Data
Aug. 7, 2018 (FR) ...................................... 18 57347

(51) Int. Cl.
*G06N 20/20* (2019.01)
*G06N 20/00* (2019.01)
(Continued)

(52) U.S. Cl.
CPC ............. *G06N 20/20* (2019.01); *G06F 17/16* (2013.01); *G06F 18/24* (2023.01); *G06N 20/00* (2019.01)

(58) Field of Classification Search
None
See application file for complete search history.

(56) References Cited

U.S. PATENT DOCUMENTS

2016/0327397 A1* 11/2016 Cordova ................ G06Q 40/08
2018/0338223 A1* 11/2018 Park ....................... B60W 40/08
(Continued)

FOREIGN PATENT DOCUMENTS

CN 201410802451 * 12/2014 ............... G06K 9/62

OTHER PUBLICATIONS

Transportation mode recognition based on smartphone embedded sensors for carbon footprint estimation Lorintiu et al. 2016 IEEE 19th International Conference on Intelligent Transportation Systems (ITSC).*

(Continued)

*Primary Examiner* — David J Stoltenberg
(74) *Attorney, Agent, or Firm* — Oblon, McClelland, Maier & Neustadt, L.L.P.

(57) ABSTRACT

A method and a device for multi-class classification of an application relative to a classification of a transport mode by machine learning, including: (a) sensors configured to measure at successive instants physical quantities specific to said application, and (b) a microprocessor configured to: (b1) acquire said successive measurements from the sensors to calculate predictors from physical quantities of said measurements, (b2) construct continuous series ($a_j$) of samples, each sample being a vector formed of a predetermined number of predictors, (b3) break down each series ($a_j$) of samples into a set of sequences ($S_k$) each corresponding to a specific class among a set of predetermined classes, (b4) under-sample the sequences associated with the classes among said set of predetermined classes while conserving for each selected sequence a predetermined fraction of samples of said sequence, thereby forming classes associated with balanced samples, and (b5) construct a classifier (F) from said balanced samples by machine learning.

13 Claims, 6 Drawing Sheets

(51) Int. Cl.
  *G06F 17/16* (2006.01)
  *G06F 18/24* (2023.01)

(56) References Cited

U.S. PATENT DOCUMENTS

| | | | | |
|---|---|---|---|---|
| 2019/0089828 | A1* | 3/2019 | Li | H04M 1/72454 |
| 2019/0095787 | A1* | 3/2019 | Kung | G06K 9/6255 |
| 2019/0287388 | A1* | 9/2019 | Salti | G06F 18/2411 |
| 2019/0387365 | A1* | 12/2019 | Spruyt | H04L 67/535 |
| 2020/0166922 | A1* | 5/2020 | Celia | G06N 7/005 |
| 2021/0176597 | A1* | 6/2021 | Li | H04W 4/029 |

OTHER PUBLICATIONS

The Effects of Random Undersampling with Simulated Class Imbalance for Big Data, Hasanin et al., 2018 IEEE International Conference on Information Reuse and Integration for Data Science.*
Boosting Mobile Apps under Imbalanced Sensing Data, Zhang et al., IEEE Transactions on Mobile Computing, vol. 14, No. 6, Jun. 2015.*
Using Smart Phone Sensors to Detect Transportation Modes, Xia et al., Sensors 2014, 14, 20843-20865; doi:10.3390/s141120843.*
Evolutionary data sampling for user movement classification, Iraklis Varlamis, 978-1-4799-7492-4/15 2015 IEEE.*
A Convolutional Neural Networks based Transportation Mode Identification Algorithm, Yanyun et al., 2017 International Conference on Indoor Positioning and Indoor Navigation (IPIN), Sep. 18-21, 2017, Sapporo, Japan.*
Transportation Modes Classification Using Sensors on Smartphones, Fang et al., Sensors 2016, 16, 1324; doi:10.3390/s16081324.*
Transportation Mode Recognition Algorithm based on Multiple Support Vector Machine Classifiers, Shaomeng et al., 2017 5th International Conference on Enterprise Systems.*
Cluster-based Majority Under-Sampling Approaches for Class Imbalance Learning, Zhang et al., 978-1-4244-6928-4/10 IEEE.*
By Train or By Car? Detecting the User's Motion Type through Smartphone Sensors Data; Bedogni et al., 978-1-4673-4404-3/12 IEEE.*
French Preliminary Search Report dated Apr. 18, 2019 in French Application 18 57347, filed on Aug. 7, 2018 (with English Translation of Categories of Cited Documents)
Haibo. He, "Learning from Imbalanced Data", IEEE Transactions on knowledge and data engineering, vol. 21, No. 9, Sep. 2009, pp. 1263-1284.
X. Y. Liu et al, "Exploratory undersampling for class-imbalance learning", IEEE Trans. Syst. Man Cybern. Part B Cybern., vol. 39, No. 2, pp. 539-550, 2009.
Zhang Xinglin et al: "Boosting Mobile, Apps under Imbalanced Sensing Data", IEEE Transactions on Mobile Computing, IEEE Service Center, Los Alamitos, CA, US, vol. 14, No. 6, Jun. 1, 2015, pp. 1151-1161, XP0I1580416.
Naeem Seliya et al: "Addressing Class Imbalance in Non-binary Classification Problems", Tools With Artificial Intelligence, 2008. ICTAI 08. 20th IEEE International Conference On, IEEE, Piscataway, NJ, USA, Nov. 3, 2008, pp. 460-466, XP031360298.
Lili Diao et al: "Training SVM email classifiers using very large imbalanced dataset", Journal of Experimental and Theoretical Artificial Intelligence., vol. 24, No. 2, Sep. 14, 2011, pp. 193-210, XP055582228, GB.
Lorintiu Oana et al: "Transportation mode recognition based on smartphone embedded sensors for carbon footprint estimation". 2016. IEEE 19th International Conference on Intelligent Transportation Systems (ITSC). IEEE. Nov. 1, 2016. pp. 1976-1981. XP033028608

* cited by examiner

DEVICE AND METHOD FOR MULTI-CLASS CLASSIFICATION BY MACHINE LEARNING

TECHNICAL FIELD

The present invention relates to the field of machine learning and, more specifically, multi-class classification.

PRIOR ART

Machine learning is an algorithmic tool that makes it possible, among other things, to construct a classifier from a database. In order that the classification by machine learning takes place correctly and that the classifier is efficient, in particular so that minority classes are correctly learned, it is advantageous that the database is the most balanced possible.

Normally, if the data are not balanced, techniques of balancing by over-sampling or, more commonly, by under-sampling of data are implemented.

At present, several under-sampling techniques are used within the context of machine learning. A first technique consists in randomly eliminating samples of majority classes. Such a technique is described by H. He in the article entitled "Learning from Imbalanced Data", IEEE Transactions on Knowledge and Data Engineering, Vol. 21, no. 9, 2009. The main defect of this technique is the loss of information and especially the risk of deleting data which may be relevant vis-á-vis majority classes.

In order to resolve this problem, a second technique exists, described for example by X. Y. Liu et al. in the article "Exploratory undersampling for class-imbalance learning", IEEE Trans. Syst. Man Cybern. Part B Cybern., Vol. 39, no. 2, pp 539-550, 2009. This second technique consists in under-sampling independently several sub-sets of the majority class and in constructing a classifier for each of these sub-sets. In the end, a plurality of classifiers is obtained which are next merged, for example, by a majority vote into a single classifier. However, this method requires the production and the storage of several classifiers thereby consuming much computing time and storage space. In addition, this method only applies for a binary classification and is not suited for a multi-class classification.

Another technique exists which combines random under-sampling with a "boosting" stimulation process. However, this latter technique has the same drawbacks as the preceding techniques.

The aim of the present invention is to propose a method and a device for multi-class classification of an application by machine learning overcoming the aforesaid drawbacks, in particular by providing a device suited to implementing a data balancing technique by under-sampling without loss of information or deletion of potentially relevant data while minimising the computing steps and the data storage space.

DESCRIPTION OF THE INVENTION

The present invention is defined by a device for multi-class classification of an application relative to a classification of a transport mode by machine learning, comprising:
sensors configured to measure at successive instants physical quantities specific to said application,
a microprocessor configured to:
  acquire said successive measurements from the sensors to compute predictors from physical quantities of said measurements, said predictors being indicative of a position or of a state of mobility,
  construct continuous series of samples, each sample being a vector formed of a predetermined number of predictors,
  break down each series of samples into a set of sequences each corresponding to a specific class among a set of predetermined classes, said set of predetermined classes corresponding to different transport modes,
  under-sample the sequences associated with classes among said set of predetermined classes while conserving for each selected sequence a predetermined fraction of samples of said sequence, thereby forming classes associated with balanced samples, and
  construct a classifier defining the transport mode classification from said balanced samples by machine learning.

The device according to the invention thereby implements an under-sampling technique making it possible to make uniform the number of samples per class by applying it to distinctive sequences and not to the set of samples. This makes it possible to simplify the under-sampling technique without loss of information or deletion of potentially relevant data while minimising the steps of computing and storage of data and, consequently, makes it possible to construct a very efficient multi-class classifier.

Advantageously, the predetermined fraction of samples comprises samples at the limits of the sequence as well as certain intermediate samples.

This makes it possible to retain the transitory samples between the different sequences knowing that these elements may be relevant while deleting a part of the stationary elements.

Advantageously, the intermediate samples are regularly spaced apart in said sequence by selecting a sample out of a predetermined number of samples.

This makes it possible to facilitate the selection of samples.

Advantageously, the sequences are associated with a sub-set of majority classes among said set of predetermined classes.

Indeed, it is faster, simpler and more relevant to only apply the under-sampling to the majority classes even though the technique may be applied systematically to all the classes.

According to a first definition, a majority class is a class of which the number of samples is greater than the average value of samples of the different classes.

This makes it possible to have a first criterion that is simple to implement to define a majority class according to the present invention.

According to a second definition, a majority class is a class of which the cumulative number of samples represents a predetermined percentage of the total number of samples of the different classes.

This makes it possible to define a majority class according to a second criterion according to the present invention.

Advantageously, the microprocessor is further configured to select the sequences to under-sample among said set of sequences as a function of predetermined selection criteria.

This embodiment makes it possible to refine the selection of the sequences to sample in order to further improve the precision of the classifier.

According to an embodiment of the present invention, the predetermined selection criteria comprise the selection of sequences having a similarity measurement greater than a predetermined threshold.

This makes it possible to reduce the number of samples in a majority class without deleting information which can be relevant.

Advantageously, the similarity measurement of a sequence corresponds to the average of the similarity measurements determined on each of the predictors of the sequence.

This makes it possible to determine with precision the similarity measurement of a sequence in a simple manner.

According to another embodiment of the present invention, the predetermined selection criteria comprise the selection of sequences having a duration greater than a predetermined temporal period.

This other embodiment makes it possible to have a quite good selection of the sequences to sample while further simplifying the computing steps.

Advantageously, the microprocessor is configured to determine the carbon footprint of the user as a function of said classification of the transport mode.

According to an embodiment of the present invention, the predictive analysis device is a mobile telephone.

The invention also targets a method for multi-class classification of an application relative to a classification of a transport mode by machine learning, comprising the following steps:
- acquiring successive temporal measurements of physical quantities specific to said application,
- calculating predictors from said physical quantities, said predictors being indicative of a position or of a state of mobility,
- constructing from said successive measurements series of samples, each sample being a temporal vector formed of a predetermined number of predictors,
- breaking down each series of samples into a set of sequences each corresponding to a specific class among a set of predetermined classes, said set of predetermined classes corresponding to different transport modes,
- under-sampling the sequences associated with the classes among said set of predetermined classes while conserving for each selected sequence a predetermined fraction of samples of said sequence, thereby forming classes associated with balanced samples, and
- constructing a classifier defining the transport mode classification from said balanced samples by machine learning.

The invention also targets a computer programme comprising code instructions for the implementation of the method according to the above method when it is executed by a microprocessor.

DETAILED DESCRIPTION OF PARTICULAR EMBODIMENTS

The basic concept of the invention is to apply locally an under-sampling technique to specific sequences of data.

Figure 1:
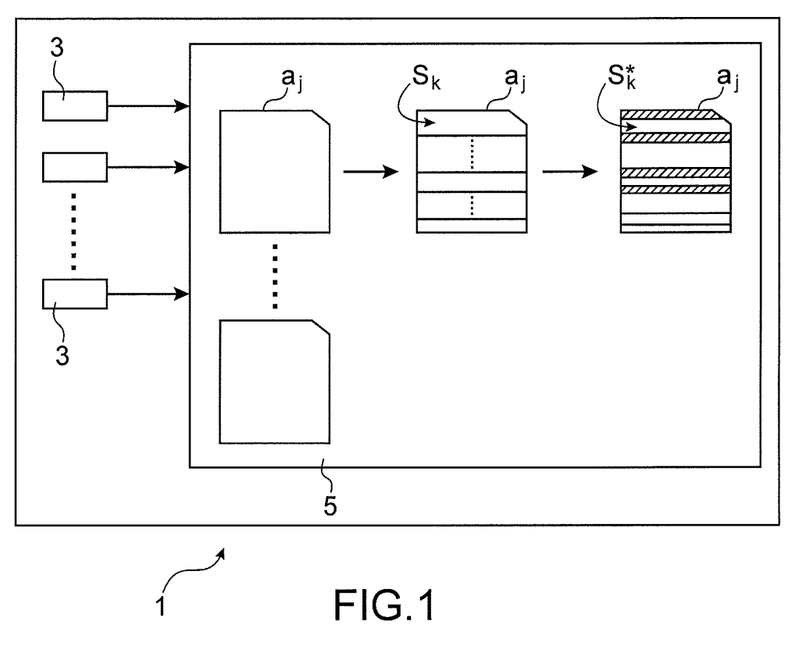
FIG. 1 schematically illustrates a device for multi-class classification of an application by machine learning, according to an embodiment of the invention.

FIG. 1 schematically illustrates a device for multi-class classification of an application by machine learning, according to an embodiment of the invention.

An example of an application according to the present invention relates to the automatic classification of different operating modes of an engine or of a machine according to a set of classes. In particular, this may concern the testing and the classification of different operating modes of a new item of equipment (for example a new engine on a test bench) by making it undergo operating conditions which can be very changeable, unpredictable and which can comprise extreme conditions. Thus, the application may consist in identifying anomalies as a function of the different classes of operating modes of the engine.

Another example of an application according to the present invention relates to the classification of a transport mode of the user of a device for multi-class classification being able to be integrated in a mobile telephone.

Yet another example of an application according to the present invention relates to the classification of the state of a user for example the state of stress according to the activity of a person. In this case, the predictive analysis device may be integrated in a wrist strap or a connected watch worn by the user.

Whatever the application, the device for multi-class classification 1 according to the invention is suited to acquire signals, balance the data derived from these signals and construct a classifier from these balanced data by machine learning.

Indeed, the device for multi-class classification 1 comprises sensors 3 and a microprocessor 5. The sensors 3 are configured to measure at successive instants physical quantities (for example, acceleration, speed, etc.) specific to the application. According to the type of application, the sensors 3 may comprise accelerometers, temperature probes, pressure probes, barometers, electrical conductivity sensors, probes for the heart rate and electrodermal activity of the user, etc.

The microprocessor 5 is configured to acquire from the sensors 3 the successive measurements of physical quantities and to compute from these physical quantities a determined number of statistical characteristics or indicators (average, variance, etc.) called "predictors" thereby forming, at each acquisition instant, a vector comprising a determined number of predictors. Hereafter, each temporal vector is called "sample" or quite simply a point.

Moreover, the microprocessor 5 is configured to construct continuous series $a_j$ of samples (i.e. series of vectors) where each series $a_j$ of samples is associated with a continuous time period.

Next, the microprocessor 5 is configured to break down each series $a_j$ of samples into a set of sub-series designated "sequences" $S_k$ each corresponding to a specific class among a set of predetermined classes. The set of classes obviously depends on the considered application. This set may correspond to the different transport modes or to the different operating modes of an item of equipment or to different stress states of a user, etc.

However, the distribution of the samples in the different classes may be imbalanced and, consequently, the microprocessor 5 is suited to rebalance this distribution before applying the machine learning.

Indeed, the microprocessor 5 is configured to under-sample sequences associated with classes among the set of predetermined classes while conserving for each selected sequence a predetermined fraction of samples representative of the sequence thereby forming balanced sequences $S_k^*$. It will be noted that it is advantageous to under-sample only sequences associated with majority classes. However, it is also possible to under-sample all sequences in a systematic manner. The under-sampling of sequences makes it possible to form classes associated with balanced data.

Finally, the microprocessor 5 is configured to implement a machine learning algorithm in order to construct a classifier F from the balanced samples.

Machine learning is an algorithmic method known to those skilled in the art, which makes it possible to automate the construction of a prediction classifier F from a set of learning data formed by the balanced data.

Hereafter, the invention will be described for an application of classification of transport mode of a user equipped with a mobile telephone comprising the multi-class classification device, according to FIG. 1.

In this case, the sensors 3 may comprise an accelerometer, a magnetometer, inertial sensors, a GPS, a speedometer, a barometer, etc. measuring for example the acceleration, the speed and the position of the user.

From the raw measurements of physical quantities of the different sensors 3, the microprocessor 5 of the mobile telephone (not represented) is configured in a known manner to construct a determined number p of predictors $P_u$ (u=1, . . . , p) indicative of the position or the state of mobility of the telephone (for example, total vibratory energy, vibratory energy in the frequency band, etc.). These predictors $P_u$ are constructed by applying for example statistical position (average, median, etc.) or dispersion (variance, standard deviation, etc.) criteria to the raw data (for example, acceleration, speed, altitude, etc.) derived from the sensors.

The different predictors $P_u$ derived from the measurements correspond to indicators and each set of p predictors $P_u$ acquired at a given instant $t_i$ forms a temporal sample $x_i$. In other words, a sample $x_i$ is a vector of size p associated with an instant $t_i$.

Furthermore, from all the successive (i=1, . . . , $m_j$) samples $x_i$, a set of acquisitions $a_j$ (j=1, . . . , n) is constructed where each acquisition $a_j$ corresponds to a recording over a continuous time period $\Delta T_j$ corresponding to the period between $t_1$ and $t_{mj}$. Each acquisition $a_j$ is thereby a series of samples associated with a corresponding continuous time period $\Delta T_j$.

The set of acquisitions $a_j$ (j=1, . . . , n) forms a database D which can be represented by a matrix of dimension M×p where each line i corresponds to a vector-sample $x_i$ of size p and each column u corresponds to a vector-predictor $P_u$ of size M=$m_1 \times m_2 \times \ldots \times m_n$ knowing that each acquisition $a_j$ comprises $m_j$ samples.

The database D may be broken down into several parts $D_j$ according to the set of acquisitions $a_j$ that is to say, D=∪ $D_j$ where each acquisition $a_j$ (i.e. each recording over a continuous period) corresponds to a part $D_j$.

It will be noted that, during each acquisition $a_j$, the class can vary and consequently, "sequence" $S_k$ will designate the set of continuous data $D_{jk}$ temporarily in an acquisition $a_j$ and of unique class $C_k$. Then, each part $D_j$ of the database may once again be broken down into a set of sub-parts $D_{jk}$, that is to say: $D_j$=∪ $D_{jk}$ where k=1, . . . , K(j). Thus, each sub-part $D_{jk}$ is a sequence $S_k$ forming a matrix of dimension l(k)×p corresponding to the data of the acquisition $a_j$ for which the class is constant and is equal to $C_k$.

The principle of the invention consists in applying under-sampling to each sequence $S_k$ and not in an overall manner to all the acquisitions $a_j$. This makes it possible to ensure that after the under-sampling step, the database D comprises samples of each sub-part $D_{jk}$ corresponding to each sequence $S_k$ thereby avoiding losing any relevant information. Moreover, no hypothesis on the nature of the problem is necessary enabling any kind of classification: binary or multi-class. In addition, the under-sampling according to the method of the invention is independent of the type of classifier that is constructed by the series.

Advantageously, for greater simplicity and rapidity, only samples of sequence(s) $S_k$ associated with majority class(es) are deleted.

Figure 2:
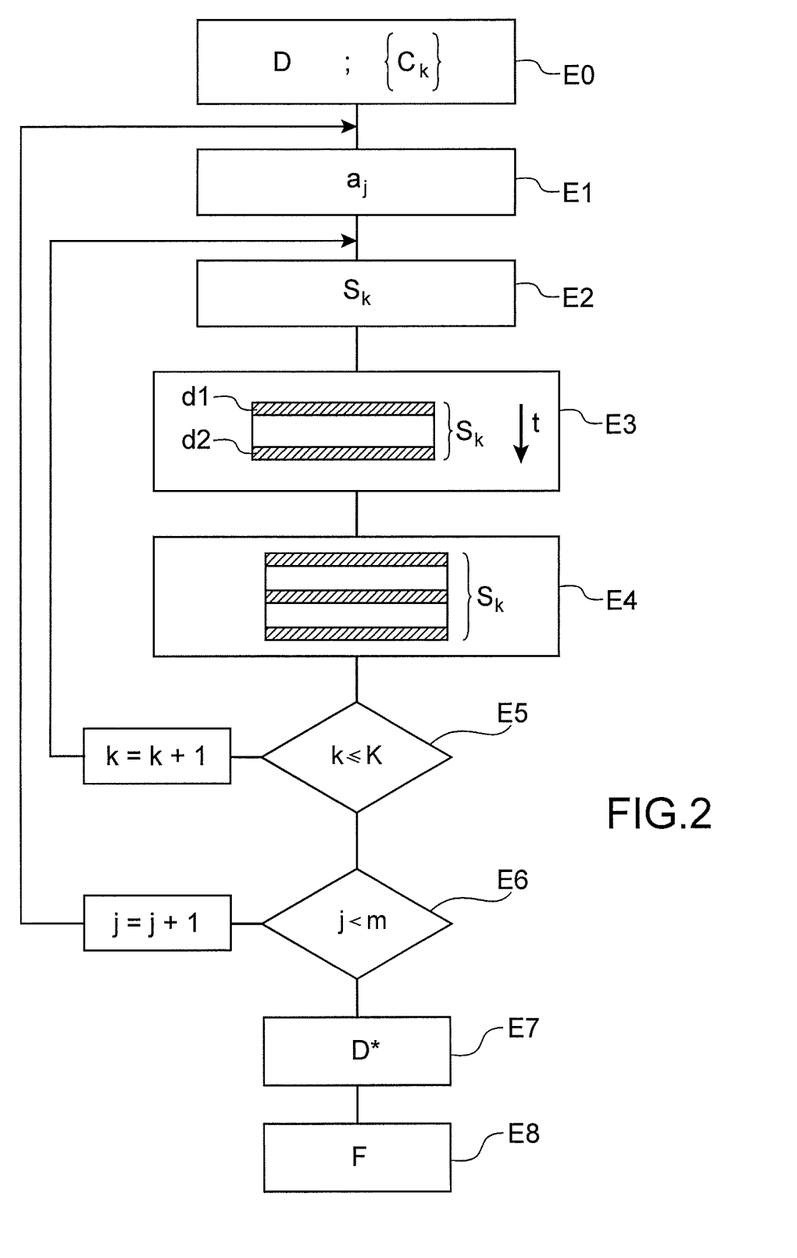
FIG. 2 is a flow chart schematically illustrating a method for multi-class classification of an application by machine learning, according to a first embodiment of the invention.

FIG. 2 is a flow chart schematically illustrating a method for multi-class classification of an application by machine learning, according to a first embodiment of the invention.

Step E0 is an initialisation step which consists in defining the database D (i.e. matrix M×p) and the classes $C_k$ to which the under-sampling is applied.

According to a first embodiment, the under-sampling is applied to the set of predetermined classes C associated with the application.

According to a second more advantageous embodiment, the under-sampling is applied to a sub-set of classes and more specifically to sequences associated with a sub-set of majority classes among the set of predetermined classes.

A majority class may be automatically identified according to different manners or criteria.

According to a first example, a majority class $C_k$ is a class of which the number l(k) of samples is greater than the average value $\overline{M}$ of samples of the set of predetermined classes C.

According to another example, a majority class $C_k$ is a class of which the cumulative number of samples represents a predetermined percentage (for example, 50%) of the total number of samples.

Steps E1-E6 form two nested loops where firstly a loop is made back to the set of acquisitions $a_j$ (j=1, . . . , m) such that on each current acquisition $a_j$, a loop is next made back (steps E2-E5) to the sequences $S_k$ ($S_k \in a_j$) where k=1, . . . , K(j) for which the class is unique, K(j) being the number of classes for the current acquisition $a_j$.

Thus, at step E1, there is a current acquisition $a_j$ and at step E2, there is a current sequence $S_k$ associated with a current majority class $C_k$ identified according to one of the above examples.

At steps E3 and E4, a predetermined fraction of samples $x_i$ belonging to each current sequence $S_k$ is conserved.

Advantageously, the predetermined fraction of samples comprises elements at the limits of the sequence as well as certain intermediate elements.

Indeed, at step E3, for a current sequence $S_k$ of total duration $d_k$, samples are conserved at the start and at the end of this sequence, over a predetermined period $d_1$ typically less than 60 seconds ($0 \leq d_1 \leq 60$).

At step E4, intermediate samples are conserved on the remaining part of the current sequence $S_k$ of duration $d_k-2d_1$. Advantageously, the intermediate elements are regularly spaced apart in the sequence $S_k$ by selecting a sample out of a predetermined number q of samples. For example, 1 sample out of 2 (q=2) or 1 sample out of 3 (q=3) is conserved. The other samples of the sequence are deleted.

Step E5 is a test to verify if all the sequences $S_k$ associated with the majority classes of the current acquisition $a_j$ have not yet been analysed. If yes, the following sequence is selected and a loop is made back to step E2 and if not, the process moves on to the following step E6.

Step E6 is a second test to verify if all the acquisitions $a_j$ have not yet been considered. If yes, the following sequence is selected and a loop is made back to step E1 and if not, the process moves on to step E7.

At step E7, an under-sampled database D* comprising more homogeneous classes is obtained.

At step E8, a classifier F is constructed from balanced data of the database D* obtained at the preceding step. The construction is carried out in a known manner by machine learning. The construction of the classifier F consists in adding an additional column to the matrix of the database. This latter column makes it possible to predict or to classify correctly the output class which in this example corresponds to the class of the transport mode.

Figure 3:
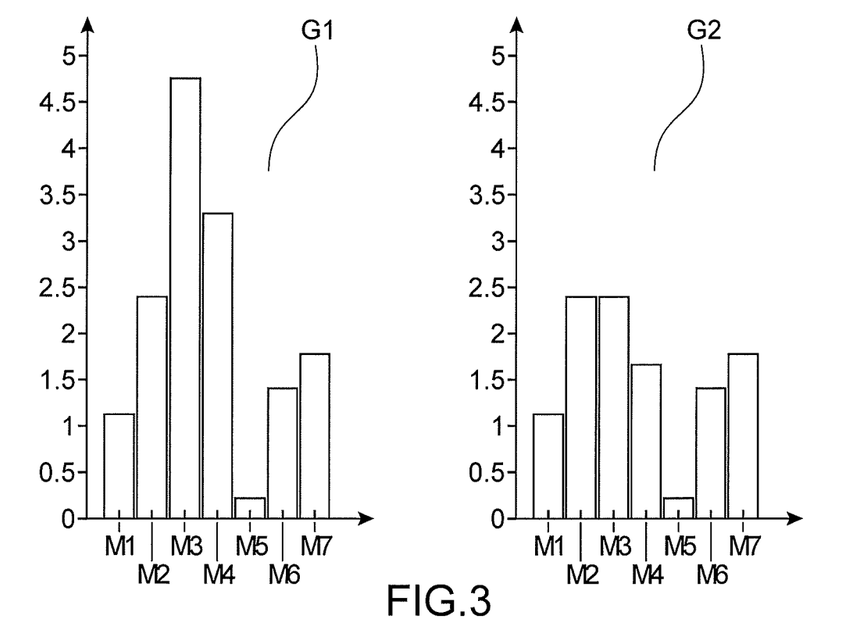
FIG. 3 is a graphic representation of an example of classification of a transport mode, according to an embodiment of the invention.

FIG. 3 is a graphic representation of an example of classification of a transport mode, according to an embodiment of the invention.

This application comprises seven classes of transport mode M1-M7: bike M1; plane M2; train M3; road (car, bus, etc.) M4; running M5; immobility M6; and walking M7.

The database for this application is derived from the sensors of a mobile telephone. The initial database D comprises 149491 samples distributed between the different transport modes M1-M7 according to the graph G1. The latter is a bar chart where each transport mode (i.e. each class) is represented by a rectangle of which the height represents the corresponding number of samples.

The transport modes by train M3 and by road M4 are majority classes of which the number of cumulative samples is greater than 50% of the total number of samples.

By applying the under-sampling according to the first embodiment of FIG. 2 to uniquely the majority classes M3 and M4, a new database D* is obtained represented in graph G2 comprising 109618 samples. In this example, the under-sampling has been applied by taking a predetermined period $d_1=0$ and by selecting 1 sample out of 2 (i.e. q=2).

In the new graphic representation G2, the classes are more balanced and the reduction in number of instances is around 27% (i.e. (149491−109618)/149491).

Moreover, if a measurement of imbalance I is defined as being the ratio between the standard deviation and the average of the vector consulted by the number of instances (i.e. samples) of each class, then a strong reduction in this imbalance I is noted, going from 0.71 to 0.49.

Furthermore, after the construction of a simple classifier (of decision tree type with a maximum number of cuts of 16), the performance is determined by calculating the proportion of correct predictions made on the learning data. More specifically, by using as performance metric the "F-measurement", it is observed that the poorest performance, that of the minority class M1 (bike) progresses by 4%, going from 30% to 34% whereas the overall performance (i.e. the average over the different classes) is hardly degraded, going from 63% to 62%, i.e. −1%. Consequently, the re-balancing of the database according to the first embodiment makes it possible to improve the performances of the minority class without degrading the overall performances.

Advantageously, the microprocessor 5 is further configured to determine the carbon footprint of the user as a function of the classification of the transport mode. Indeed, by having a classifier which correctly predicts the transport mode, it is possible to estimate the carbon footprint of a person with great precision.

FIGS. 4-8 illustrate other embodiments in which the selection of sequences to under-sample is carried out as a function of predetermined criteria.

Figure 4:
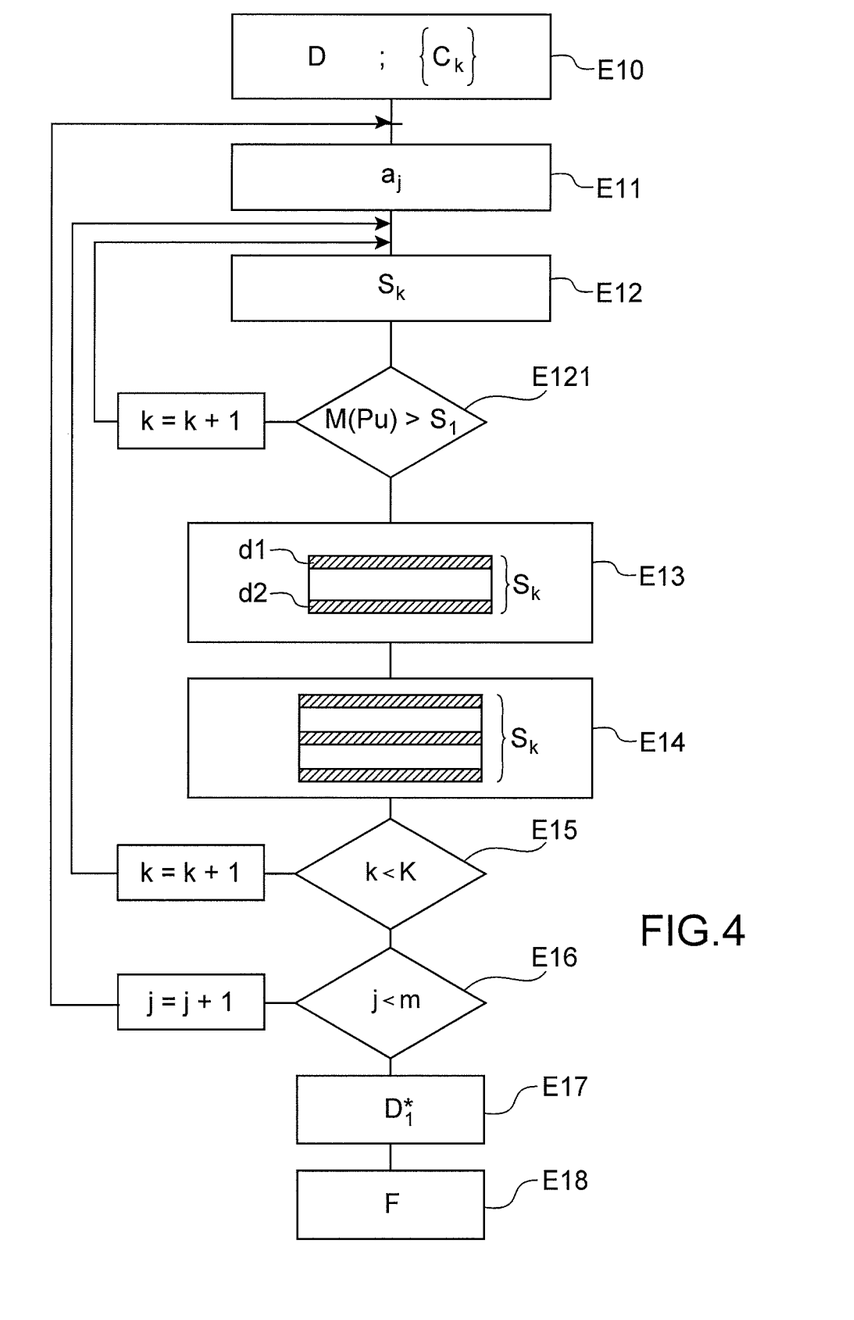
FIG. 4 is a flow chart schematically illustrating a method for multi-class classification of an application by machine learning, according to a second embodiment of the invention.

More specifically, FIG. 4 is a flow chart schematically illustrating a method for multi-class classification of an application by machine learning, according to a second embodiment of the invention.

The flow chart of FIG. 4 is identical to that of FIG. 2 except that during a treatment of a current sequence, the under-sampling is applied as a function of a similarity measurement. The principle of this second embodiment is the fact that it is preferable to perform the under-sampling on sequences of which the data are similar with each other in order not to lose relevant information.

According to this embodiment, from a similarity measurement of a given predictor, it is considered that the similarity measurement of a sequence corresponds to the average of the similarity measurements on each of the predictors of the sequence.

More specifically, let $M(P_u)$ be a similarity measurement of a given predictor $P_u$ of size l(k) knowing that the predictor $P_u$ is a vector (column) belonging to a given sequence $S_k$ of dimension l(k)×p. The similarity measurement $M(P_u)$ may be based on the computation of a normalised auto-covariance of the predictor $P_u$ for a given shift τ (for example, τ=3). In an alternative, the measurement may be based on the computation of the average of the normalised auto-covariance of the predictor $P_u$ on shifts of 1 to $N_c$ (for example, $N_c=10$).

Then, for the given sequence $S_k$ (matrix l(k)×p), it is possible to define a similarity measurement $M(S_k)$ of the sequence as the average over the predictors of the similarity measurement $M(P_u)$ defined on each of the predictors: $M(S_k)=\overline{M(P_u)}$. The under-sampling is carried out uniquely on sequences of which the similarity measurement $M(S_k)$ is greater than a certain threshold $s_1$. The value of the threshold $s_1$ may be chosen according to the type of application and may be a number greater than or equal to 0.1.

More specifically, step E10 concerns the definition of the database D of dimension M×p and of the classes $C_k$ to which the under-sampling is applied.

It is considered that the under-sampling is applied to sequences associated with majority classes.

As previously, the flow chart comprises two nested loops on the set of acquisitions $a_j$ (j=1, . . . , m) and on the set of sequences $S_k$ ($S_k \in a_j$) where k=1, . . . , K(j) except that an additional internal loop is introduced to verify the similarity measurement of each sequence.

Thus, at step E11, there is a current acquisition $a_j$ and at step E12, there is a current sequence $S_k$ associated with a current majority class $C_k$.

Step E121 is a test to verify if the similarity measurement of the sequence is greater than a predetermined threshold $s_1$ (for example, $s_1=0.3$). If yes, the process moves on to step E13 and if not, the following sequence is selected and a loop is made back to step E12.

At steps E13 and E14, a predetermined fraction of samples $x_i$ is conserved belonging to the current sequence $S_k$ selected at the preceding step.

As previously, at step E13, the samples are conserved at the start and at the end of the selected sequence, over a predetermined period $d_1$.

At step E14, intermediate samples are conserved on the remaining part of the selected current sequence $S_k$. For example, 1 sample out of 2 or 1 sample out of 3 is conserved and the other samples of the sequence are deleted.

Step E15 is a second test to verify if all the sequences $S_k$ associated with the majority classes of the current acquisition $a_j$ have not yet been analysed. If yes, the following sequence is selected and a loop is made back to step E12 and if not, the process moves on to step E16.

Step E16 is a third test to verify if all the acquisitions $a_j$ have not yet been considered. If yes, the following sequence is selected and a loop is made back to step E11 and if not, the process moves on to step E17.

At step E17, a new under-sampled database $D_1^*$ comprising more homogeneous classes is obtained.

At step E18, a classifier F is constructed from the balanced data of the database $D_1^*$ obtained at the preceding step.

Figure 5:
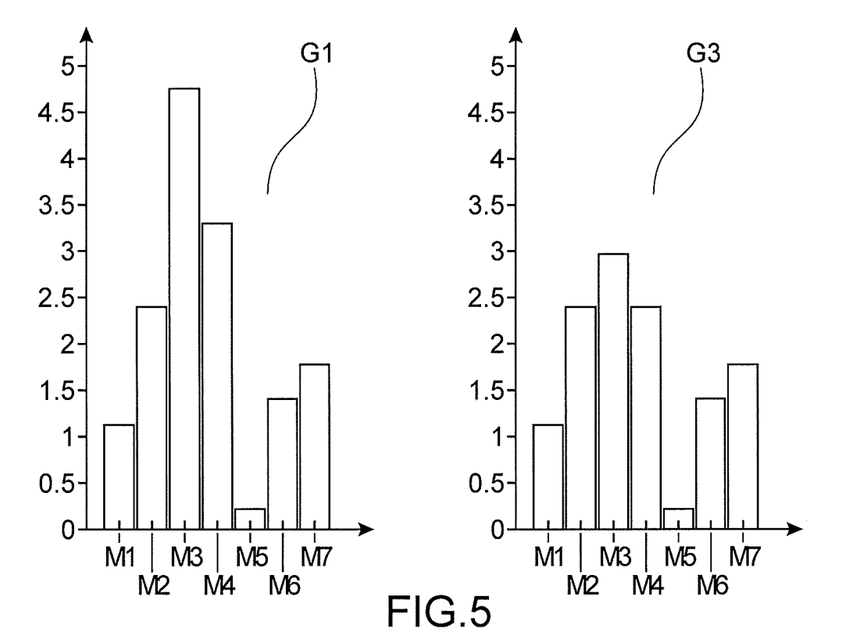
FIG. 5 is a graphic representation of a classification of a transport mode, according to the embodiment of FIG. 4.

FIG. 5 is a graphic representation of a classification of a transport mode, according to the embodiment of FIG. 4.

The same example as previously is considered. Thus, the graph G1 still represents an initial database D comprising 149491 samples distributed between the different transport modes M1-M7.

By applying the under-sampling according to the second embodiment of FIG. 4 to uniquely the majority classes M3 and M4, a new database $D_1^*$ represented in graph G3 comprising 122618 samples is obtained. In this example, the under-sampling has been applied according to the following parameters: $s_1=0.3$; $d_1=0$; $q=3$.

In the new graphic representation, the classes are more balanced and the reduction in number of instances is around 19%. The measurement of imbalance I goes from 0.71 to 0.53.

Furthermore, after the construction of a simple classifier, it is observed that the poorest performance, that of the minority class M1 (bike) progresses by 11%, going from 30% to 41% whereas the overall performance (i.e. the average over the different classes) is improved by 1%, going from 63% to 64%.

Figure 6:
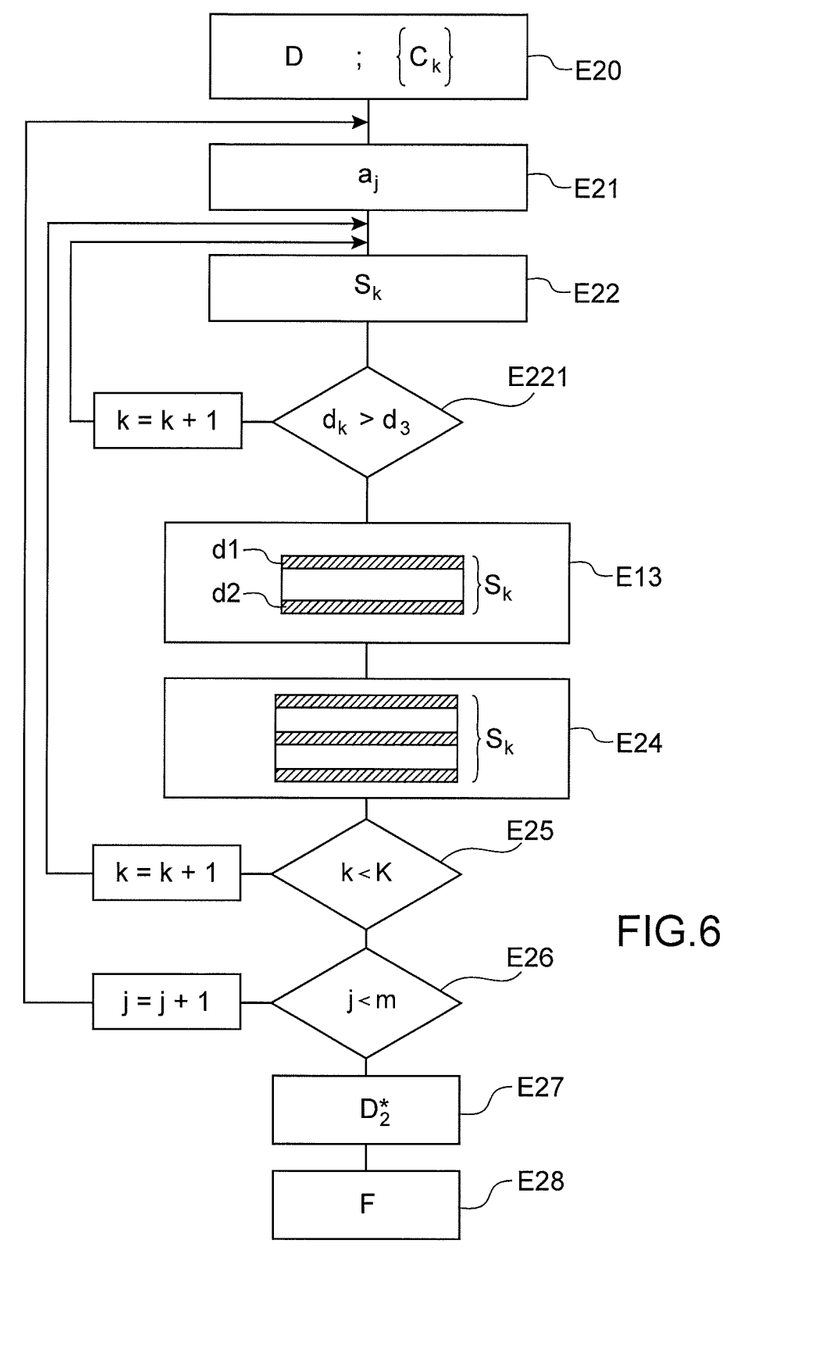
FIG. 6 is a flow chart schematically illustrating a method for multi-class classification of an application by machine learning, according to a third embodiment of the invention.

FIG. 6 is a flow chart schematically illustrating a method for multi-class classification of an application by machine learning, according to a third embodiment of the invention.

The flow chart of FIG. 6 is identical to that of FIG. 4 except that during the treatment of a current sequence, the under-sampling is based this time on the duration of the sequence and no longer on the similarity measurement.

The principle of this third embodiment is the existence in most cases of an increasing relationship between similarity and the duration of a sequence.

Figure 7:
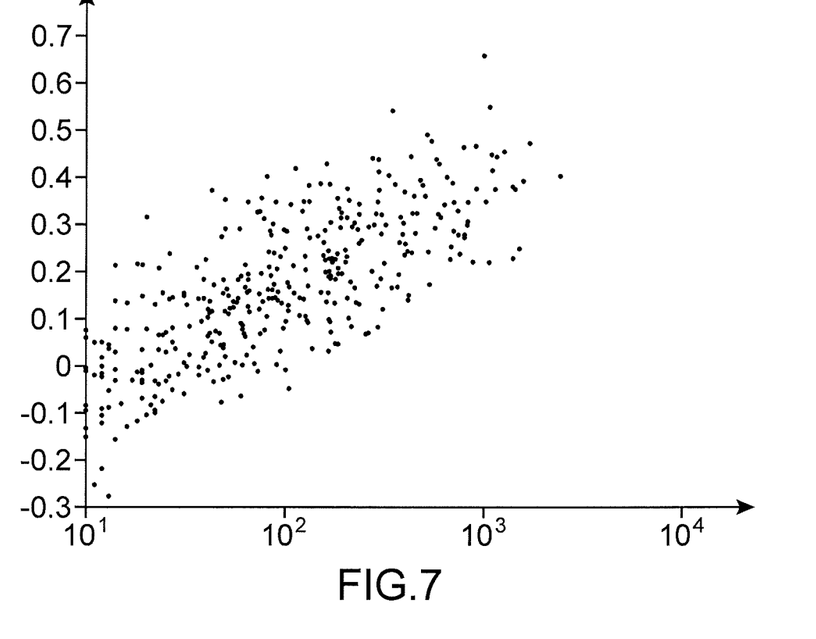
FIG. 7 is a graph representing the similarity of sequences as a function of their durations, according to the example of FIG. 5.

Indeed, FIG. 7 is a graph representing the similarity of sequences as a function of their durations, according to the example of FIG. 5.

The data of the example of FIG. 5 are used to represent the relationship between the similarity measurement of sequences and their durations in the form of point clouds. The similarity measurement is represented on the Y-axis whereas the duration of each sequence is represented on the X-axis. This representation clearly highlights the increasing correlation between the similarity measurement and the number of samples. This signifies that the longer a sequence, the more probable it is that the similarity measurement of this sequence is high.

The advantage of this test is the fact that it makes it possible to better balance the classes compared to the first embodiment according to FIG. 2 without requiring important computational resources.

Step E20 of FIG. 6 concerns the definition of the database D of dimension M×p and the classes $C_k$ to which the under-sampling is applied.

It is considered that the under-sampling is applied to sequences associated with majority classes.

As previously, the flow chart comprises three nested loops except that the third loop is a test to verify the duration of each sequence.

Thus, at step E21, there is a current acquisition $a_j$ and at step E22, there is a current sequence $S_k$ associated with a current majority class $C_k$.

Step E221 is a test to verify if the duration $d_k$ in seconds of the sequence $S_k$ is greater than a predetermined temporal period $d_3$ (for example, $d_3=300$ s). If yes, the process moves on to step E23 and if not, the following sequence is selected and a loop is made back to step E22.

At steps E23 and E24, a predetermined fraction is conserved of samples $x_i$ belonging to the current sequence $S_k$ selected at the preceding step like steps E13 and E14 of FIG. 4.

Step E25 is a second test to verify if all the sequences $S_k$ associated with the majority classes of the current acquisition $a_j$ have been analysed. If yes, the process moves on to step E26 and if not, the following sequence is selected and a loop is made back to step E22.

Step E26 is a third test to verify if all the acquisitions $a_j$ have been considered. If yes, the process moves on to step E27 and if not, the following sequence is selected and a loop is made back to step E21.

At step E27, a new under-sampled database $D_2^*$ comprising more homogeneous classes is obtained.

At step E28, a classifier is constructed from balanced data of the database $D_2^*$ obtained at the preceding step.

Figure 8:
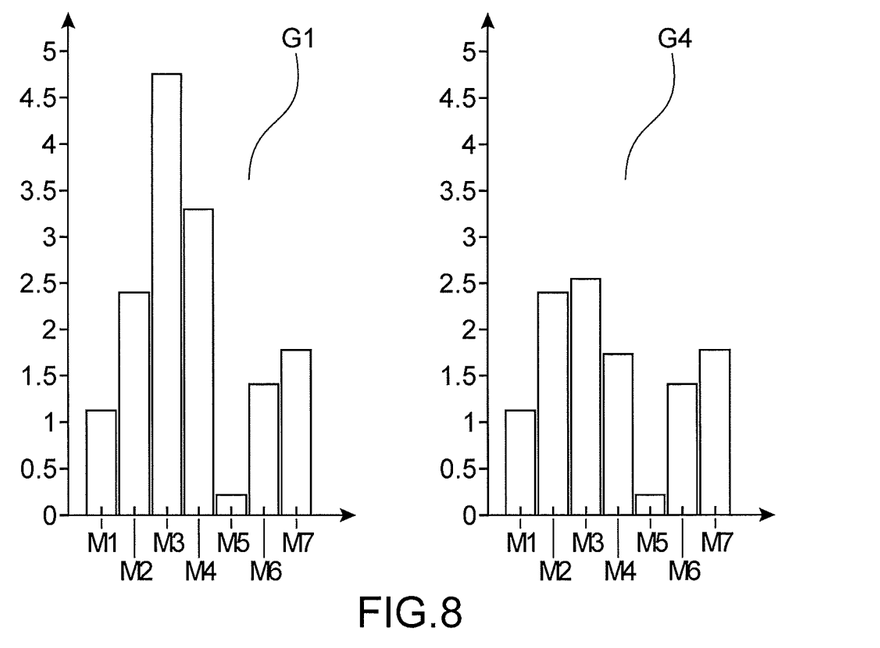
FIG. 8 is a graphic representation of a classification of a transport mode, according to the embodiment of FIG. 6.

FIG. 8 is a graphic representation of a classification of a transport mode, according to the embodiment of FIG. 6.

The same example as previously is considered. Thus, the graph G1 still represents an initial database D comprising 149491 samples distributed between the different transport modes M1-M7.

By applying the under-sampling according to the third embodiment of FIG. 4 to uniquely the majority classes M3 and M4, a new database $D_2^*$ represented in graph G4 comprising 111706 samples is obtained. In this example the under-sampling has been applied according to the following parameters: $d_3=300$; $d_1=0$; $q=3$.

In the new graphic representation, the classes are more balanced and the reduction in the number of instances is around 26%. The measurement of imbalance I goes from 0.71 to 0.49.

Furthermore, after the construction of a simple classifier, it is observed that the poorest performance, that of the minority class M1 (bike) progresses by 13%, going from 30% to 43% whereas the overall performance is hardly degraded, going from 63% to 62%.

The invention claimed is:

1. A device for multi-class classification of an application relative to a classification of a transport mode by machine learning, the device comprising:

sensors configured to acquire, at successive instants, measurements of physical quantities specific to said application; and a microprocessor configured to:

acquire said successive measurements from the sensors to calculate predictors from physical quantities of said measurements, said predictors being indicative of a position or of a state of mobility, construct continuous series of samples, each sample being a vector formed of a predetermined number of predictors, break down each series of samples into a set of distinctive sequences each corresponding to a specific unique class among a set of predetermined classes, said set of predetermined classes corresponding to different transport modes, under-sample the sequences associated with the unique classes, without under-sampling the sequences associated with an overall class, among said set of predetermined classes while conserving for each selected sequence a predetermined fraction of samples of said sequence, thereby forming classes associated with balanced samples, and construct a classifier defining the transport mode classification from said balanced samples by machine learning.

2. The device according to claim 1, wherein the predetermined fraction of samples comprises samples at limits of the each selected sequence and intermediate samples.

3. The device according to claim 1, wherein intermediate samples are regularly spaced apart in said each selected sequence by selecting a sample out of a predetermined number of samples.

4. The device according to claim 1, wherein the under-sampled sequences are sequences associated with a sub-set of majority classes among said set of predetermined classes.

5. The device according to claim 4, wherein a majority class is a class of which the number of samples is greater than an average value of samples of the different classes.

6. The device according to claim 4, wherein a majority class is a class of which cumulative number of samples represents a predetermined percentage of a total number of samples of the different classes.

7. The device according to claim 1, wherein the microprocessor is further configured to select the sequences to under-sample among said set of distinctive sequences as a function of predetermined selection criteria.

8. The device according to claim 7, wherein the predetermined selection criteria comprise the selection of sequences having a similarity measurement greater than a predetermined threshold.

9. The device according to claim 8, wherein the similarity measurement of a sequence corresponds to the average of the similarity measurements determined on each of the predictors of the sequence.

10. The device according to claim 7, wherein the predetermined selection criteria comprise the selection of sequences having a duration greater than a predetermined temporal period.

11. The device according to claim 1, wherein the microprocessor is configured to determine a carbon footprint of a user of said device as a function of said classification of the transport mode.

12. The device according to claim 1, wherein
the device is a predictive analysis device, and
the predictive analysis device is a mobile telephone.

13. A non-transitory computer readable medium storing instructions which when executed by a processor cause the processor to perform a method for multi-class classification of an application relative to a classification of a transport mode by machine learning, the method comprising:

acquiring successive temporal measurements of physical quantities specific to said application, calculating predictors from said physical quantities, said predictors being indicative of a position or of a state of mobility, constructing from successive measurements series of samples, each sample being a temporal vector formed of a predetermined number of predictors, breaking down each series of samples into a set of distinctive sequences each corresponding to a specific unique class among a set of predetermined classes, said set of predetermined classes corresponding to different transport modes, under-sampling sequences associated with the unique classes, without under-sampling the sequences associated with an overall class, among said set of predetermined classes while conserving for each selected sequence a predetermined fraction of samples of said sequence, thereby forming classes associated with balanced samples, and constructing a classifier defining the transport mode classification from said balanced samples by machine learning.

* * * * *